(12) United States Patent
Morita

(10) Patent No.: US 8,516,599 B2
(45) Date of Patent: Aug. 20, 2013

(54) INFORMATION PROCESSING APPARATUS AND METHOD, COMMUNICATION APPARATUS AND METHOD, AND INFORMATION PROCESSING SYSTEM

(75) Inventor: Tadashi Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 615 days.

(21) Appl. No.: 12/753,243

(22) Filed: Apr. 2, 2010

(65) Prior Publication Data

US 2010/0257594 A1 Oct. 7, 2010

(30) Foreign Application Priority Data

Apr. 7, 2009 (JP) ................................. 2009-092906

(51) Int. Cl.
*G06F 17/30* (2006.01)
(52) U.S. Cl.
USPC .............................................. 726/26; 705/65
(58) Field of Classification Search
USPC ............................................................ 726/5
See application file for complete search history.

(56) References Cited

U.S. PATENT DOCUMENTS 7,248,855 B2 * 7/2007 Joyce et al. .................... 455/406

FOREIGN PATENT DOCUMENTS

JP 2004102726 2/2004

* cited by examiner

*Primary Examiner* — Gilberto Barron, Jr.
*Assistant Examiner* — Devin Almedia
(74) *Attorney, Agent, or Firm* — K&L Gates LLP

(57) ABSTRACT

An information processing apparatus includes: a register holding a value input thereto; a first communication path through which an addition command is input; a second communication path through which a subtraction command is input; addition means adding a predetermined value to a register value held in the register according to the addition command input through the first communication path and causing the register to hold a value resulting from the addition; and subtraction means subtracting a predetermined value from a register value held in the register according to the subtraction command input through the second communication path and causing the register to hold a value resulting from the subtraction, wherein the addition means and the subtraction means operate exclusively of each other.

11 Claims, 9 Drawing Sheets

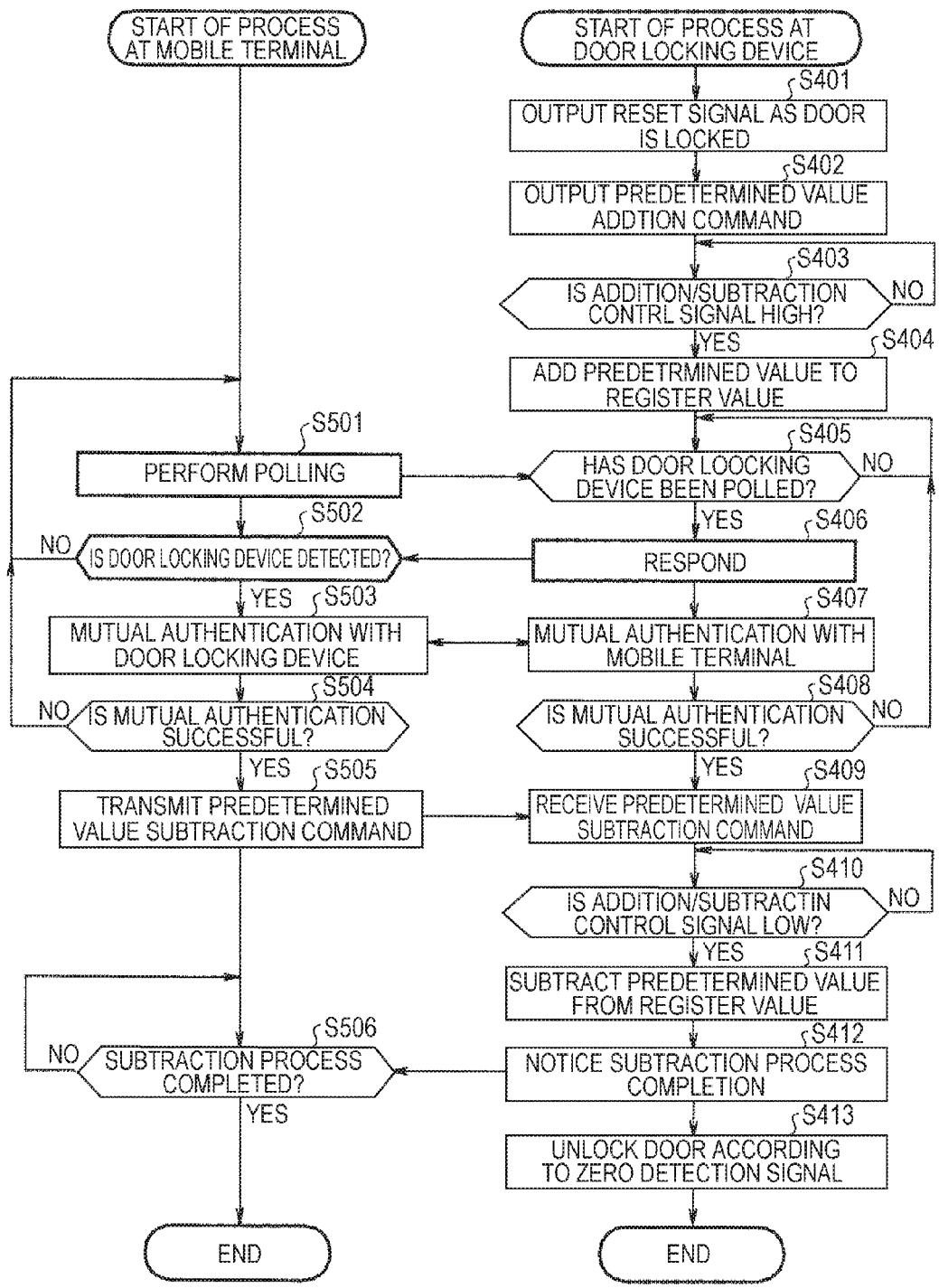

INFORMATION PROCESSING APPARATUS AND METHOD, COMMUNICATION APPARATUS AND METHOD, AND INFORMATION PROCESSING SYSTEM

CROSS REFERENCES TO RELATED APPLICATIONS

The present application claims priority to that disclosed in Japanese Priority Patent Application JP 2009-092906 filed in the Japan Patent Office on Apr. 7, 2009, the entire content of which is hereby incorporated by reference.

BACKGROUND

The present application relates to an information processing apparatus and method, a communication apparatus and method, and an information processing system. More particularly, the invention relates to an information processing apparatus and method, a communication apparatus and method, and an information processing system which are advantageous for constructing, for example, an electronic money system utilizing contactless communication techniques.

In the related art, contactless IC cards such as FeliCa (a registered trademark) cards and mobile telephones incorporating an IC chip having functions equivalent to those of contactless IC cards are available, and electronic money systems are operated utilizing such cards or mobile telephones (for example, see JP-A-2004-102726 (Patent Document 1)).

FIG. 1 shows an exemplary configuration of an electronic money system in operation. An electronic money system 1 is formed by IC cards 2 which are possessed by purchasers of commodities, store terminals 3 provided at stores where the commodities are sold, and a server 5 connected to the store terminals 3 connected through a communication line 4.

A credit value (a prepaid amount of money) is recorded in advance in an IC card 2. When the card is brought into a predetermined range from a reader/writer 13 of a store terminal 3, settlement information is communicated between the card and the reader/writer 13 on a contactless basis.

The store terminal 3 includes a control section 11, an input section 12, the reader/writer 13, and sale information database (DB) 14. The control section 11 controls information reading and writing carried out by the reader/writer 13 to record sale information in the sale information database 14. The control section 11 also transmits recorded sale information to the server 5 which is connected to the section through the communication line 4. The input section 12 advises the control section 11 of the price of a commodity input by a salesperson. The reader/writer 13 communicates with the IC card 2 on a contactless basis.

The server 5 is installed at, for example, the company providing the electronic money service. The server accumulates sale information supplied from each store terminal 3 and calculates money received (the amount of commodities sold) at each store based on sale information thus accumulated during each predetermined period.

When a purchaser purchases a commodity, the price of the commodity is input to the input section 12 by a salesperson of the store, and the IC card 2 is brought into close proximity to the reader/writer 13 by the purchaser. Thus, communication is started between the reader/writer 13 and the IC card 2 to enable a mutual authentication process. When the mutual authentication process has successful results, a credit value is read out from the IC card 2 by the reader/writer 13 and advised to the control section 11. At the control section 11, the price of the commodity input from the input section 12 is subtracted from the credit value of the IC card 2 thus read out, and the amount subtracted is advised to the reader/writer 13 to cause it to write the result of subtraction in the IC card 2. The control section 11 also causes a record of this sale to be stored in the sales record database 14. Sales records stored in the sales record database 14 are advised to the server 5 at predetermined timing (e.g., once a day at the closing times of the stores) and accumulated at the server. The server 5 calculates the amount of money received at each store based on sales records thus accumulated.

SUMMARY

The electronic money system operated as described above has the following problems.

Since a mutual authentication process is carried out between an IC card 2 and a reader/writer 13, a common secret key must be held by each of them. Information on sales during a predetermined period must be stored in the sales information database 14 in each store terminal 3, and measures must be taken to prevent the information from being tampered or lost. Since high anti-tampering performance must therefore be provided, the manufacturing cost of the store terminals 3 has been high.

It has been necessary to install a plurality of store terminals 3 of different types at a store in order to allow a plurality of different electronic money systems to be accommodated at the store. The reader/writer 13 incorporated in a store terminal 3 always radiates an electromagnetic wave to be always ready for communication with an IC card 2. Therefore, when a plurality of store terminals 3 are installed, the terminals must be kept apart from each other to prevent mutual interference between electronic waves radiated from them. When there are spatial limitations on the installation of store terminals 3, it may be practically difficult to install a plurality of store terminals 3 at a store in some occasions.

Under such circumstances, it is desirable to allow an electronic money system having high anti-tampering performance to be constructed at a relatively low cost.

According to an embodiment, there is provided an information processing apparatus including a register holding a value input thereto, a first communication path through which an addition command is input, a second communication path through which a subtraction command is input, addition means adding a predetermined value to the register value held in the register according to the addition command input through the first communication path and causing the register to hold a value resulting from the addition, and subtraction means subtracting a predetermined value from the register value held in the register according to the subtraction command input through the second communication path and causing the register to hold a value resulting from the subtraction. The addition means and the subtraction means operate exclusively of each other.

The addition means may operate only when the register value is 0, and the subtraction means may operate only when the register value is not 0.

A register value acquisition command may be also input through the second communication path, and the subtraction means may acquire the register value according to the register value acquisition command input through the second communication path and may output the register value through the second communication path.

The information processing apparatus according to the embodiment may further include zero detection means generating a zero detection signal indicating that the register value has changed from a non-zero state to a zero state.

The information processing apparatus according to the embodiment may further include authentication means for performing a mutual authentication process with an electronic apparatus from which the subtraction command is transmitted.

The information processing apparatus according to the embodiment may further include communication means for performing contactless radio communication with a communication apparatus from which the subtraction command is transmitted.

The communication means may have an NFC (near field communication) target function.

According to the embodiment, there is provided an information processing method of an information processing apparatus including a register holding a value input thereto, a first communication path through which an addition command is input, and a second communication path through which a subtraction command is input. The method includes the steps of adding a predetermined value to the register value held in the register according to the addition command input through the first communication path and causing the register to hold a value resulting from the addition, and subtracting a predetermined value from the register value held in the register according to the subtraction command input through the second communication path and causing the register to hold a value resulting from the subtraction. The process at the addition step and the process at the subtraction step are performed exclusively of each other.

According to the embodiment, the process of adding a predetermined value to the register value held in the register according to the addition command input through the first communication path and causing the register to hold a value resulting from the addition, and the process of subtracting a predetermined value from the register value held in the register according to the subtraction command input through the second communication path and causing the register to hold a value resulting from the subtraction are performed exclusively of each other.

According to another embodiment, there is provided a communication apparatus including first connection means connecting to a sever through a predetermined communication line, second connecting means connecting to an information processing apparatus by contactless radio communication, and relaying means relaying information between the server and the information processing apparatus.

The first connection means may connect to the server through a mobile telephone line.

The second connection means may connect to the information processing apparatus using an NFC (near field communication) initiator function.

According to the embodiment, there is provided a communication method of a communication apparatus, including the steps of connecting to a sever through a predetermined communication line, connecting to an information processing apparatus by contactless radio communication, and relaying information between the server and the information processing apparatus.

According to the embodiment, the communication apparatus is connected to the server through the predetermined communication line and connected to the information processing apparatus by contactless radio communication. The apparatus relays information between the server and the information processing apparatus.

According to another embodiment, there is provided an information processing system including an information processing apparatus and a communication apparatus. The information processing apparatus includes a register holding a value input thereto, a first communication path through which an addition command is input, a second communication path through which a subtraction command is input, addition means adding a predetermined value to the register value held in the register according to the addition command input through the first communication path and causing the register to hold a value resulting from the addition, and subtraction means subtracting a predetermined value from the register value held in the register according to the subtraction command input through the second communication path and causing the register to hold a value resulting from the subtraction. The addition means and the subtraction means operating exclusively of each other. The communication apparatus includes first connection means connecting to a sever through a predetermined communication line, second connecting means connecting to an information processing apparatus by contactless radio communication, and relaying means relaying information between the server and the information processing apparatus.

According to the embodiment, the process of adding a predetermined value to the register value held in the register according to the addition command input through the first communication path and causing the register to hold a value resulting from the addition, and the process of subtracting a predetermined value from the register value held in the register according to the subtraction command input through the second communication path and causing the register to hold a value resulting from the subtraction are performed exclusively of each other. The communication apparatus is connected to the server through the predetermined communication line and connected to the information processing apparatus by contactless radio communication. The apparatus relays information between the server and the information processing apparatus.

According to an embodiment, an electronic money system having high anti-tampering performance can be constructed at a relatively low cost.

Additional features and advantages are described herein, and will be apparent from the following Detailed Description and the figures.

BRIEF DESCRIPTION OF THE FIGURES

FIG. 9 is a flow chart for explaining operations of the door locking/unlocking system according to the embodiment.

DETAILED DESCRIPTION

The present application will now be described in detail with reference to the drawings according to an embodiment. First and second embodiments will be described below.

First Embodiment

Exemplary Configuration of Electronic Money System

Figure 1:
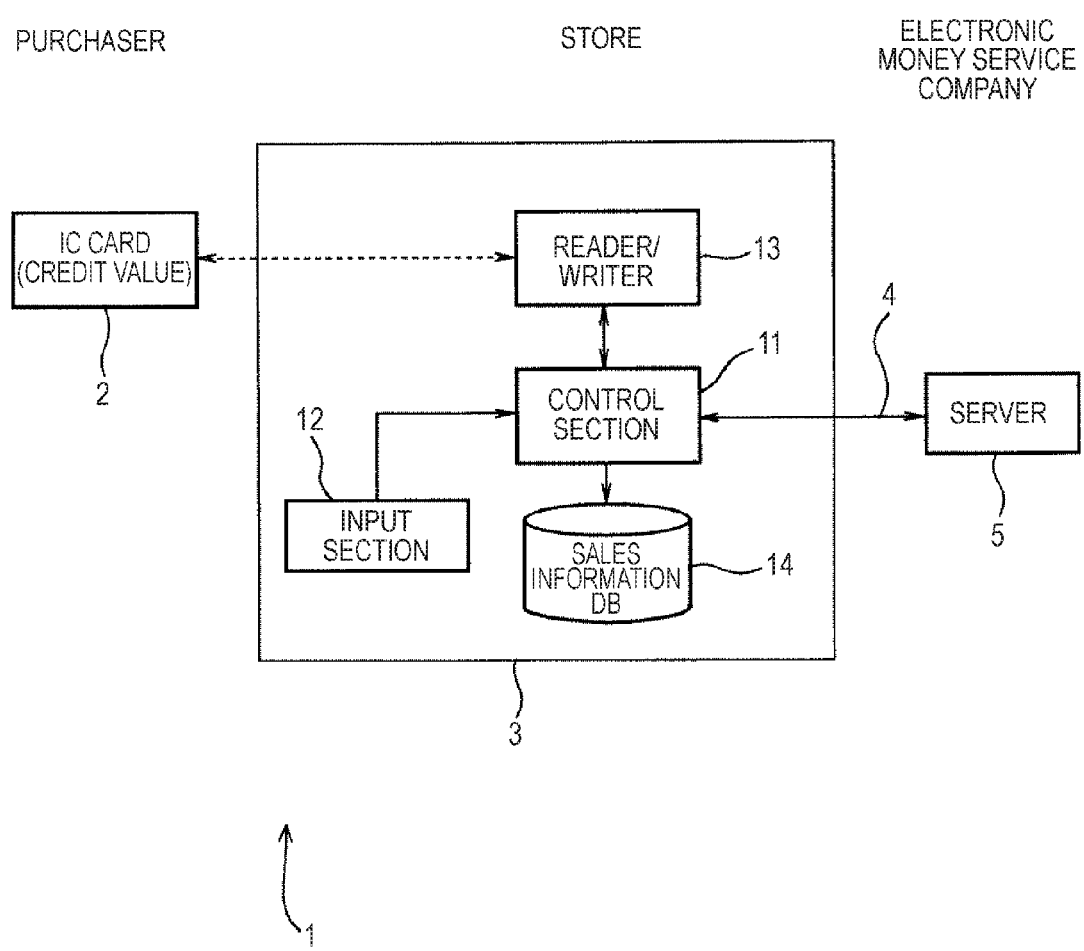
FIG. 1 is a block diagram showing an exemplary configuration of an electronic money system according to the related art.
Figure 2:
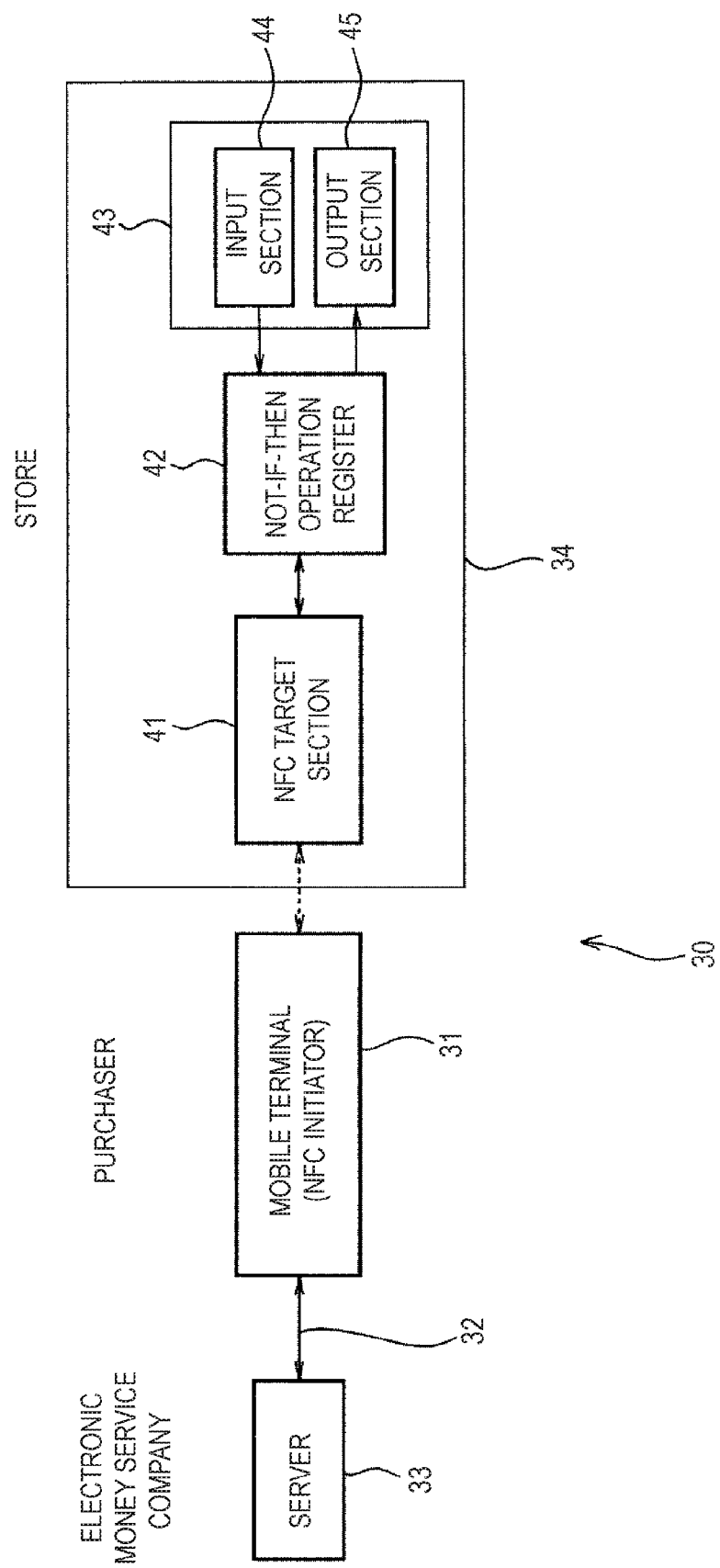
FIG. 2 is a block diagram showing an exemplary configuration of an electronic money system according to an embodiment.

An electronic money system according to a first embodiment will now be described with reference to FIG. 2. FIG. 2 shows an exemplary configuration of the electronic money system.

An electronic money system 30 is formed by mobile terminals 31 used by purchasers of commodities, a server 33 installed at a company providing the electronic money service, and store terminals 34 installed at stores selling the commodities.

A mobile terminal 31 functions like common mobile telephones, and the terminal is made to function also as an NFC (near field communication) initiator by executing a predetermined application program.

An NFC initiator is a device for initiating near field radio communication by carrying out polling to detect a response from an NFC target that is a party to communicate. An NFC target is a device which responds to polling carried out by an NFC initiator to start near field radio communication with the NFC initiator.

A mobile terminal 31 connects to the server 33 through a mobile telephone line 32 and causes the server to authenticate the terminal itself. Thereafter, the terminal uses the NFC initiator function to perform near field radio communication with a store terminal 34 having the NFC target function, thereby relaying various types of information between the store terminal 34 and the server 33.

The server 33 authenticates the mobile terminal 31 connected thereto through the mobile telephone line 32, and mutual authentication is carried out between the server and the store terminal 34 through the mobile terminal 31. After the mutual authentication is successfully carried out, the server acquires settlement information including the amount of money of a purchased commodity from the store terminal 34 through the mobile terminal 31. The server 33 has identification information for identifying the mobile terminal 31 and information on the user of the mobile terminal 31 registered in advance, the user information including settlement information such as credit card information and bank account information, and credit value information.

The store terminal 34 includes an NFC target section 41, a NOT-IF-THEN operation register 42, and a control section 43.

The NFC target section 41 functions as an NFC target and performs near field radio communication with the mobile terminal 31 having the NFC initiator function.

The NOT-IF-THEN operation register 42 includes a data input/output portion (abbreviated as "DIO" in FIG. 3) 51A which is connected to the control section 43 and another data input/output portion (abbreviated as "DIO" in FIG. 3) 51B which is connected to the NFC target section 41.

The NOT-IF-THEN operation register 42 alternately performs a process of adding a value input from the DIO 51A to a value held in a register 59 incorporated therein (hereinafter referred to as "register value") and a process of subtracting a value input from the DIO 51B from the register value. That is, the processes of adding and subtracting a value to and from the register value are performed on an exclusive basis.

The control section 43 includes an input portion 44 and an output portion 45. The input portion 44 includes a ten key pad and a reset key which are operated by a salesperson of a store. When a salesperson inputs the price of a commodity using the input portion 44, the control section 43 outputs an input value setting signal including the commodity price and an addition command to the NOT-IF-THEN operation register 42. When the salesperson performs a predetermined reset operation (e.g., an operation of pressing the reset key) using the input portion 44, the control section 43 outputs a reset signal to the NOT-IF-THEN operation register 42.

The output portion 45 includes a display and an alarm generator. The output portion displays the register value on the display based on a display output signal input from the NOT-IF-THEN operation register 42 and outputs an alarm sound according to a zero detection signal input from the NOT-IF-THEN operation register 42.

Figure 3:
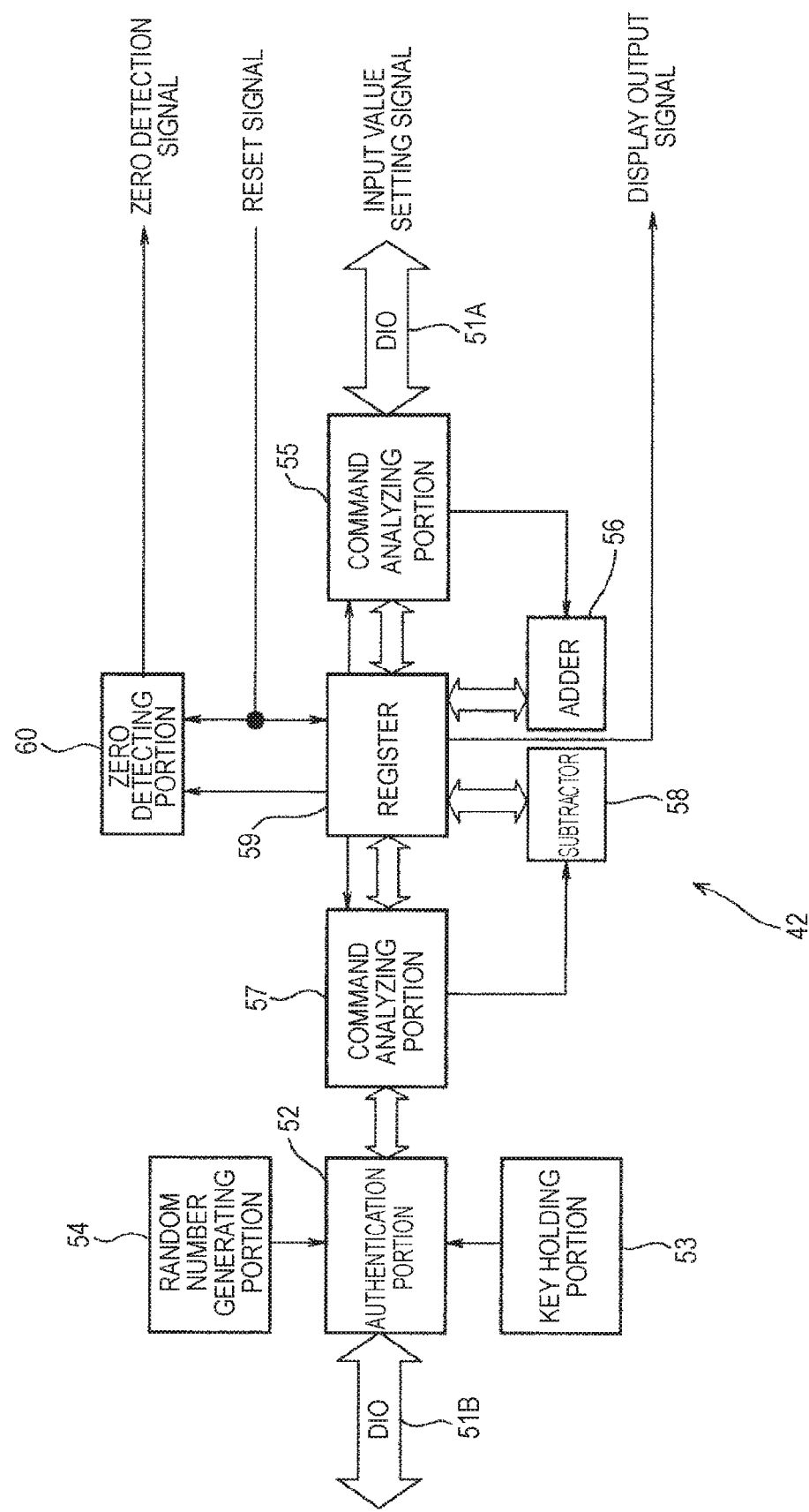
FIG. 3 is a block diagram showing an exemplary configuration of a NOT-IF-THEN operation register incorporated in a store terminal shown in FIG. 2.

FIG. 3 is a detailed diagram showing an exemplary configuration of the NOT-IF-THEN operation register 42 forming part of the store terminal 34 shown in FIG. 2. The NOT-IF-THEN operation register 42 includes the data input/output portions (DIO) 51A and 51B, an authentication portion 52, a key holding portion 53, a random number generating portion 54, a command analyzing portion 56, an adder 56, another command analyzing portion 57, a subtractor 58, a register 59, and a zero detector 60.

The DIO 51A connects the control section 43 and the command analyzing portion 55 to input an input value setting signal from the control section 43 to the command analyzing portion 55. An input value setting signal includes the price of a commodity and an addition command.

The DIO 51B connects the NFC target section 41 and the command analyzing portion 57 to input various commands input from the server 33 through the NFC target section 41 to the command analyzing portion 57. Specifically, the various commands input from the server 33 through the NFC target section 41 include a register value acquisition command and a register value subtraction command.

The authentication portion 52 carries out a mutual authentication process between itself and the server 33 using a secret key held in the key holding portion 53 and a random number generated by the random number generating portion 54. After the mutual authentication process is successfully carried out, communication is enabled between the DIO 51B and the command analyzing portion 57. The server 33 holds the same secret key as the secret key held in the key holding portion 53.

The command analyzing portion 55 controls the adder 56 based on the input value setting signal input through the DIO 51A only when an addition/subtraction control signal input from the register 59 is high. Specifically, the portion 55 causes the commodity price included in the input value setting signal to be added to the register value.

According to the control exercised by the command analyzing portion 55, the adder 56 adds the commodity price included in the input value setting signal to the register value.

The command analyzing portion 57 acquires the register value in response to the register value acquisition command input through the DIO 51B only when the addition/subtraction control signal input from the register 59 is low. The command analyzing portion 57 controls the subtractor 58 based on the register value subtraction command input through the DIO 51B. Specifically, the DIO causes a value input along with the register value subtraction command to be subtracted from the register value.

According to the control exercised by the command analyzing portion 57, the subtractor 58 subtracts the specified value from the register value.

The command analyzing portion 55 and the command analyzing portion 57 may be integrated with each other. The adder 56 and the subtractor 58 may be also integrated with each other.

The register 59 holds 0 or a positive value and initializes the register value held therein to 0 according to a reset signal input from the control section 43. The register 59 outputs an addition/subtraction control signal to the command analyzing portions 55 and 57, the signal being high when the register value held in the register is 0 and being low when the register value is not 0.

The zero detection portion 60 monitors the register value and outputs a zero detection signal at low level according to the reset signal input from the control section 43. The register value thereafter becomes a positive value other than 0 as a result of the addition carried out by the adder 56, and a zero detection signal at high level is output when the register value becomes 0 as a result of the subtraction carried out by the subtractor 58.

[State Transitions of NOT-IF-THEN Operation Register 42]

Figure 4:
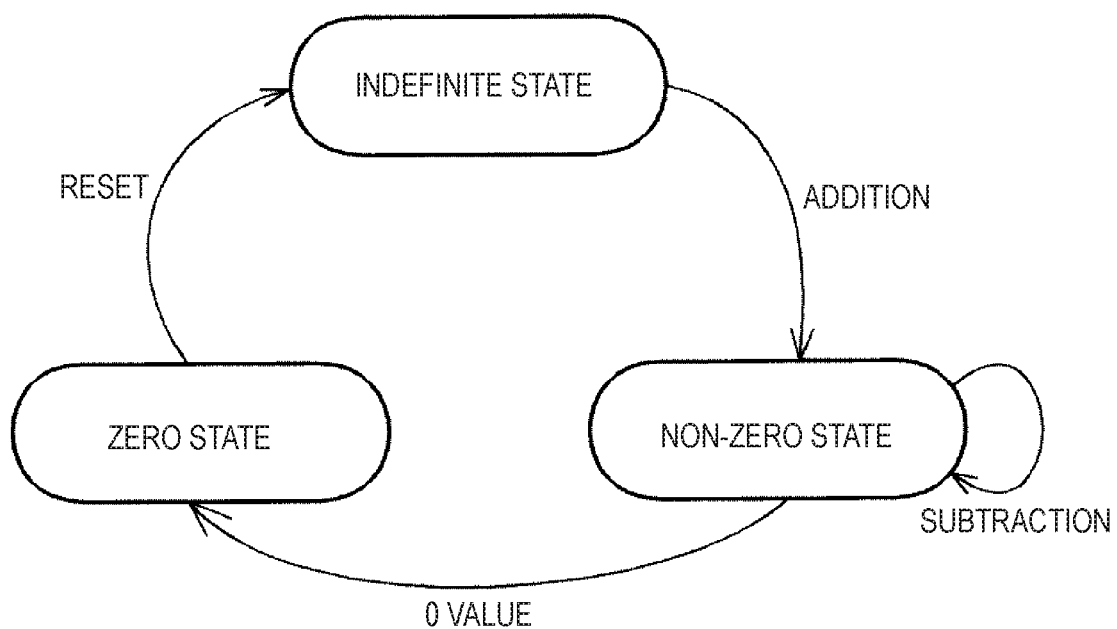
FIG. 4 is a state transition diagram of the NOT-IF-THEN operation register shown in FIG. 3.
Figure 5:
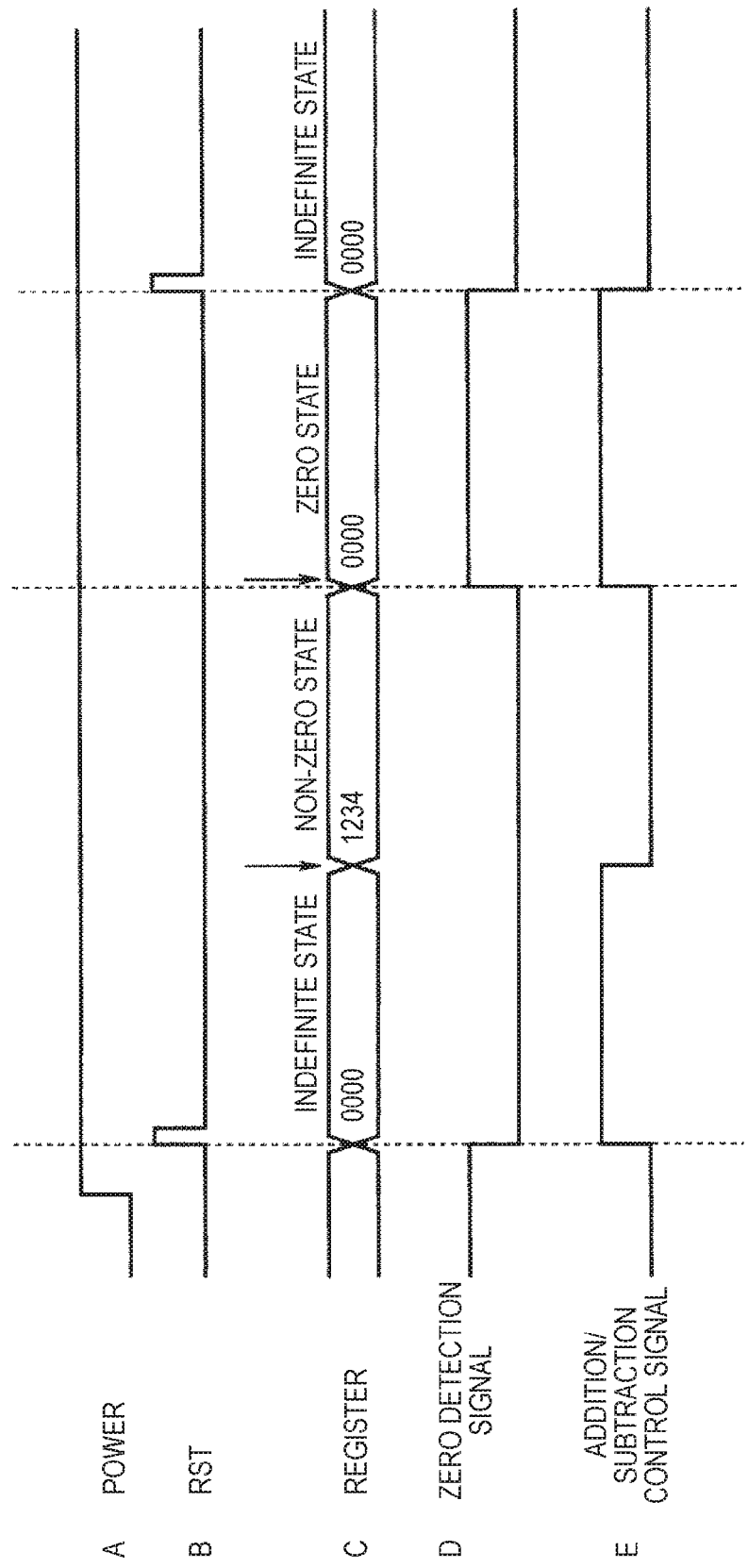
FIG. 5 is a diagram showing timing at which each signal of the NOT-IF-THEN operation register in FIG. 3 is generated.

State transitions of the NOT-IF-TERN operation register 42 (i.e., the register 59 included therein) will now be described with reference to FIGS. 4 and 5. FIG. 4 is state transition diagram of the NOT-IF-THEN operation register 42. FIG. 5 shows timing of operations performed in the store terminal 34. Specifically, FIG. 5 shows power supply on/off states (A), states of the reset signal (B), register values (C), states of the zero detection signal (D), and states of the addition/subtraction control signal (E).

As shown in FIG. 4, the NOT-IF-TERN operation register 42 is in any of an indefinite state, a non-zero state, and a zero state.

The indefinite state is a standby state in which the register stays before a commodity price is input from a salesperson. During the period of this state, the register value is 0, and a message prompting the input of a commodity price is displayed on the display of the output portion 45. Referring to FIG. 5, the zero detection signal is in the low state in this period (as indicated by D). When a commodity price is input and the value is added to the register value to change it to a positive value in the indefinite state, a transition to the non-zero state takes place.

The non-zero state is a state in which the register 59 has a commodity price set therein, and the commodity price is displayed on the display of the output portion 45 in the period of this state. The zero detection signal stays low. When subtraction from the register value is carried out according to a register value subtraction command from the server 33 in the non-zero state to change the register value to 0, a transition to the zero state takes place.

The zero state is a state in which the register value is 0 as a result of subtraction from a positive value, and the zero detection signal is high in this state. According to the zero detection signal at high level, the output portion 45 displays a message or outputs an alarm sound to advise that an account has been settled. When a reset signal is input from the control section 43 in the zero state as indicated by B in FIG. 5, the register 59 is initialized to 0, and a transition to the indefinite state takes place.

[Description of Operations]

Figure 6:
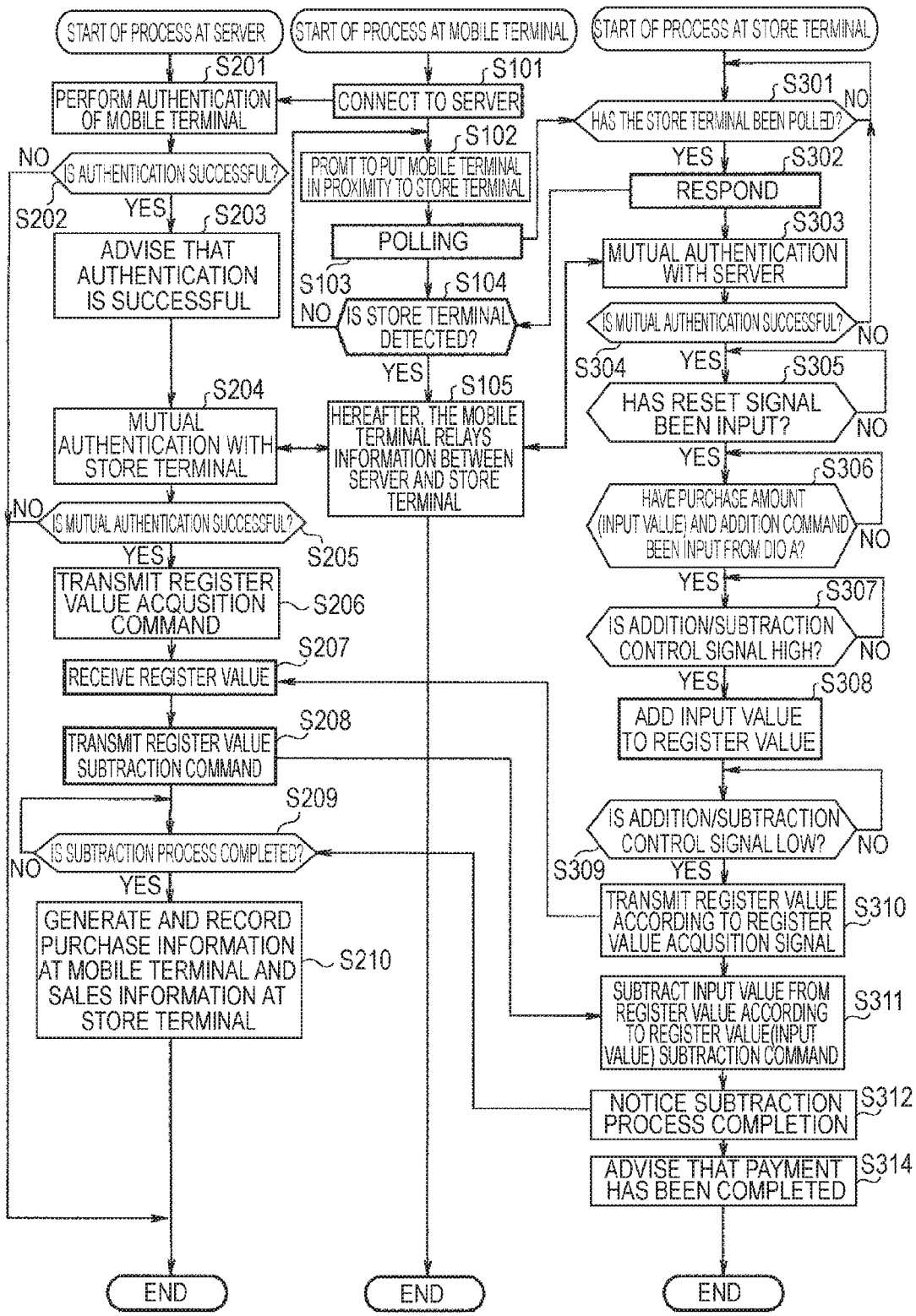
FIG. 6 is a timing chart for explaining operations of the electronic money system according to the embodiment.

A description will now be made on operations performed by the electronic money system 30 when a user of a mobile terminal 31 (purchaser) purchases a commodity. FIG. 6 is a timing chart showing operations of the mobile terminal 31, server 33, and store terminal 34 forming the electronic money system 30.

The series of operations is started when the mobile terminal 31 starts operating as an NFC initiator according to a predetermined application program activated in response to a predetermined operation of the user who is going to purchase a commodity.

At step S101, the mobile terminal 31 connects to the server 33 through the mobile telephone line 32. When the mobile terminal 31 is connected, the server 33 performs a process of authenticating the mobile terminal 31 at step S201 and determines whether the authentication process has been successful or not at step S202. When it is determined that the authentication process has been successful, the process proceeds to step S203 at which the mobile terminal 31 is advised that it has been successfully authenticated. When it is determined that the process of authenticating the mobile terminal 31 has been unsuccessful, the process at the server 33 is terminated.

When the successful result of authentication is advised from the server 33, the mobile terminal 31 advises the user of the successful result of authentication and prompts the user to put the mobile terminal 31 in close proximity to the store terminal 34 at step S102. The mobile terminal 31 starts polling to detect the store terminal 34 at step S103 and determines whether the store terminal 34 has been detected or not at step S104. The processes at the steps S103 and S104 are repeated until it is determined that the store terminal 34 has been detected.

The NFC target section 41 of the store terminal 34 stays in a standby state until it is polled by the mobile terminal 31 at step S301. When polled by the mobile terminal 31, the section responds to the polling by the mobile terminal 31 at step S302.

When the mobile terminal 31 determines at step S104 that the store terminal 34 has been detected from the response of the NFC target section 41, the process proceeds to step S105 at and after which the mobile terminal 31 relays various types of information between the server 33 and the store terminal 34.

A mutual authentication process is carried out between the server 33 and the store terminal 34. The process is carried out by the server 33 and the store terminal 34 (specifically, the authentication portion 52 thereof) as steps S204 and S303, respectively. The mutual authentication process is carried out using a common secret key provided in the server 33 and the store terminal 34 in advance and a random number. When the mutual authentication process between the server 33 and the store terminal 34 is successful, the process at the server 33 proceeds to step S206, and the process at the store terminal 34 proceeds to step S305. When the mutual authentication process is unsuccessful, the server 33 terminates the process, and the process at the store terminal 34 returns to step S301.

The server 33 transmits a register value acquisition command at step S206. The register value acquisition command is relayed by the mobile terminal 31 and provided to the command analyzing portion 57 through the DIO 51B. At the command analyzing portion 57, a process according to the register value acquisition command is performed (step S310) only when an addition/subtraction control signal input from the register 59 is low.

The store terminal 34 prompts a salesperson to perform a reset operation and to input a commodity price at step S305. Further, the NOT-IF-THEN operation register 42 stays in a standby state at step S305 until a reset signal is input from the control section 43 to the register 59 and the zero detecting portion 60 according to a reset operation performed by the user. When a reset signal is input, the register undergoes a transition to the indefinite state in which the register value is initialized to 0 and in which the addition/subtraction control signal is asserted high. The process then proceeds to step S306.

At step S306, the NOT-IF-THEN operation register 42 stays in a standby state until an input value A and an addition command are input from the control section 43 to the command analyzing portion 55 through the DIO 51A in response to the input of a commodity price A performed by the user. When the input value A and the addition command are input, the process proceeds to step S307.

At step S307, the command analyzing portion 55 checks whether the addition/subtraction control signal from the register 59 is high or not. When it is confirmed that the addition/subtraction control signal is high, the process proceeds to step S308. At step S308, the command analyzing portion 55 controls the adder 56 to cause it to add the input value A to the register value. Since the register value changes from 0 to the positive value A as a result of the addition, a transition to the non-zero state takes place, and the addition/subtraction control signal is asserted low by the register 59.

At step S309, the command analyzing portion 57 checks whether the addition/subtraction control signal from the register 59 is low or not. When it is confirmed that the addition/subtraction control signal is low, the process proceeds to step S310. At step S310, the command analyzing portion 57 acquires the register value (the value A obtained as a result of the addition at step S308 in this case) according to the register value acquisition command from the server 33 which has already been received, and the register value is output to the DIO 51B. The register value A is relayed by the mobile terminal 31 to be transmitted to the server 33.

At step S207, the server 33 receives the register value A relayed by the mobile terminal 31. At step S208, the server 33 transmits a register value subtraction command for subtracting the received register value A from the current register value A. The register value subtraction command is relayed by the mobile terminal 31 and received by the command analyzing portion 57 through the DIO 51B. Thereafter, the process proceeds to step S209, and the server stays in a standby state until it receives a subtraction process completion notice.

At step S311, since the addition/subtraction control signal is low, the command analyzing portion 57 controls the subtractor 58 to cause it to subtract the register value A from the value A held in the register 59 according to the register value subtraction command. Since the register value returns to 0 from the positive value A as a result of the subtraction, a transition to the zero state takes place. The zero detection signal is asserted high by the zero detection portion 60, and the addition/subtraction signal is asserted high by the register 59.

At step S312, the command analyzing portion 57 confirms that the subtraction process has been completed from the fact that the addition/subtraction control signal has become high and outputs a subtraction process completion notice to the DIO 51B. The subtraction process completion notice is relayed by the mobile terminal 31 to be transmitted to the server 33.

At step S313, according to the zero detection signal which has become high, the control section 43 controls the output portion 45 to cause it to display a message indicating that the account has been settled and to cause it to output an alarm sound indicating that the account has been settled. The salesperson of the store can be advised of the completion of settlement from such indications. Further, the purchaser can be advised of the completion of the settlement from the alarm sound. Thereafter, the purchaser may move the mobile terminal 31 away from the store terminal 34.

Upon receipt of the subtraction process completion notice, the server 33 determines that the subtraction process has been completed at step S209, and the process proceeds to step S210. At step S210, the server 33 generates purchase information associated with the mobile terminal 31 and sale information associated with the store terminal 34 and records those pieces of information in the database of itself. Thereafter, settlement is made for the user of the mobile terminal 31 based on the recorded purchase information. Settlement (such as payment for the amount of the sale) is made for the store side based on the recorded sale information.

According to the above-described operations of the electronic money system 30, the secret key used for the authentication process is required only at the DIO 51B to which a register value subtraction command is input. At the DIO 51A to which a commodity price is input, no secret key is required, and it is obvious that no password is required either.

Sale information is transmitted to the server 33 from a mobile terminal 31 at each sale instead of being held at the store. Therefore, even if there is an ill-willed person belonging to the store who attempts to tamper the sale information, the sale information can be prevented from being tampered.

Further, since the store terminal 34 radiates no electromagnetic wave, a plurality of the store terminals 34 can be disposed adjacent to each other.

Figure 7:
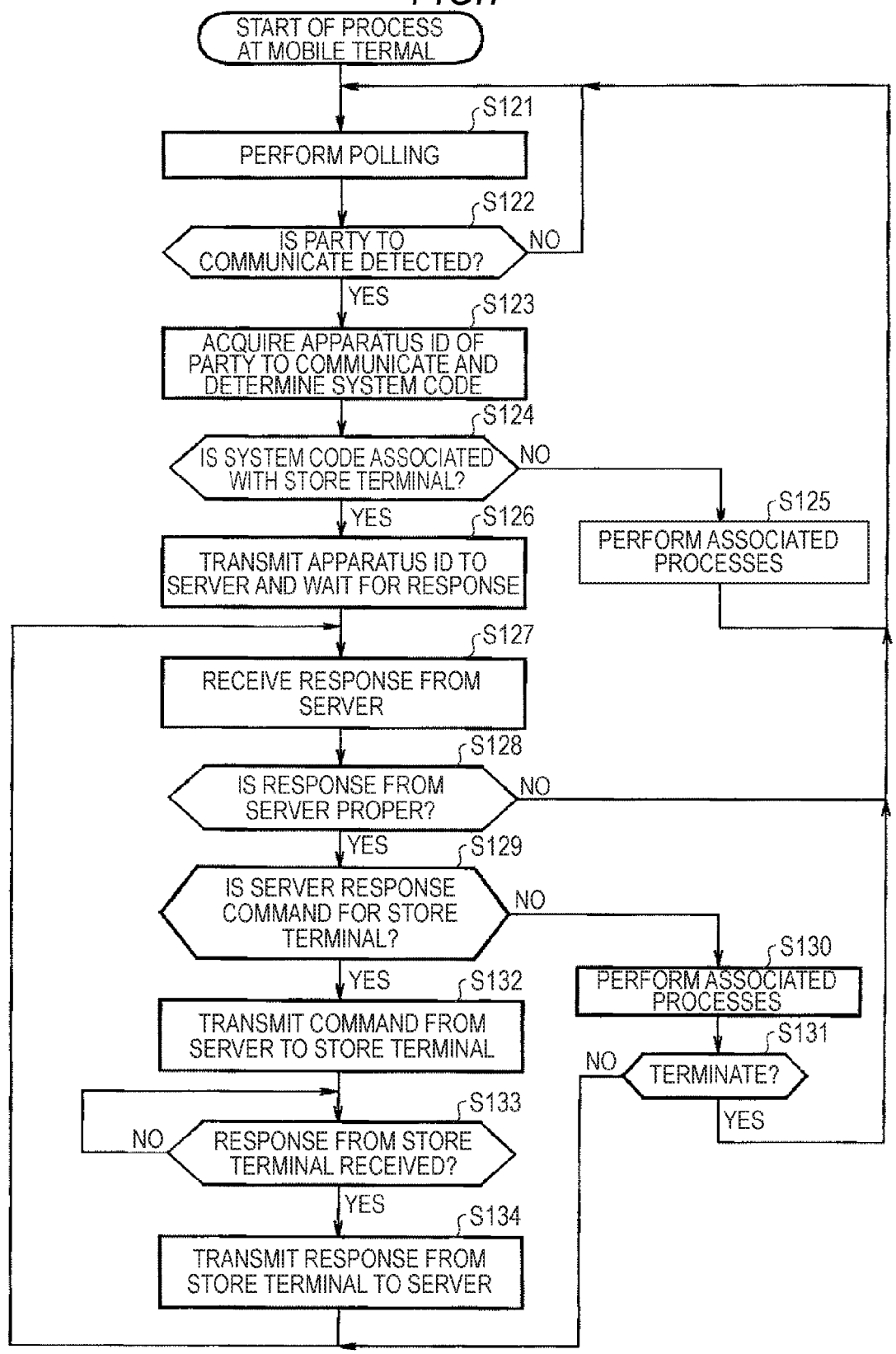
FIG. 7 is a flow chart for explaining operations of a mobile terminal according to the embodiment.

A description will now be made on processes performed by the mobile terminal 31 after the authentication process performed by the server 33 is successfully completed, among the operations of the electronic money system 30 described above. FIG. 7 is a flow chart for explaining the processes of the mobile terminal 31.

At step S121, the mobile terminal 31 starts polling to detect a party to communicate (the store terminal 34 is assumed to be the party). At step S122, the mobile terminal 31 determines whether a party to communicate has been detected or not. The processes at steps S121 and S122 are repeated until it is determined that a party to communicate has been detected. When it is determined that a party to communicate has been detected, the process proceeds to step S123.

At step S123, the mobile terminal 31 acquires an apparatus ID from the party to communicate thus detected and determines a system code based on the acquired apparatus ID. A system code is information indicating whether an apparatus of the party to communicate is in compliance with the NFC or FeliCa standard.

At step S124, the mobile terminal 31 determines whether the system code thus determined is associated with the store terminal 34 (or in compliance with the NFC standard) or not. When it is determined that the system code is not associated with the store terminal 34 (for example, when it is determined that the system code is in compliance with the Felica standard), the process proceeds to step S125 at which a process is performed according to the result of the determination. The process thereafter returns to step S121 to repeat the above-described steps.

When it is determined at step S124 that the system code thus determined is associated with the store terminal 34, the process proceeds to step S126. At step S126, the mobile terminal 31 transmits the apparatus ID of the other party acquired at step S123 to the server 33 and stays in a standby state until the server 33 transmits a response to the transmission of the apparatus ID.

The response transmitted from the server 33 is received by the mobile terminal 31 at step S127. At step S128, the mobile terminal 31 determines whether the response from the server 33 is proper or not, and the process proceeds to step S129 only when it is determined that the response is proper. When it is determined that the response from the server 33 is improper and an error has therefore occurred, the process returns to step S121 to repeat the above-described steps.

At step S129, the mobile terminal 31 determines whether the response from the server 33 is a command for the store terminal 34 (a register value acquisition command or a register value subtraction command) or not. When it is determined that the response is not a command for the store terminal 34, the process proceeds to step S130 at which a process according to the response from the server 33 is performed. At step S131, it is determined whether the transaction with the store terminal 34 that is currently in communication is to be terminated or not. When it is determined that the transaction is to be terminated, the process returns to step S121 to repeat the above-described steps.

When it is determined at step S129 that the response from the server 33 is a command for the store terminal 34, the process proceeds to step S132. At step S132, the mobile terminal 31 transmits the command for the store terminal 34, which is the response from the server 33, to the store terminal 34. At the step S133, the mobile terminal enters a standby state to wait until a response from the store terminal 34 is received. When a response is received from the store terminal 34, the process proceeds to step S134. At step S134, the mobile terminal 31 transmits the response from the store terminal 34 to the server 33. Thereafter, the process returns to step S127 to repeat the above-described steps. The mobile terminal 31 operates as described above.

Second Embodiment

Exemplary Configuration of Door Locking/Unlocking System

Figure 8:
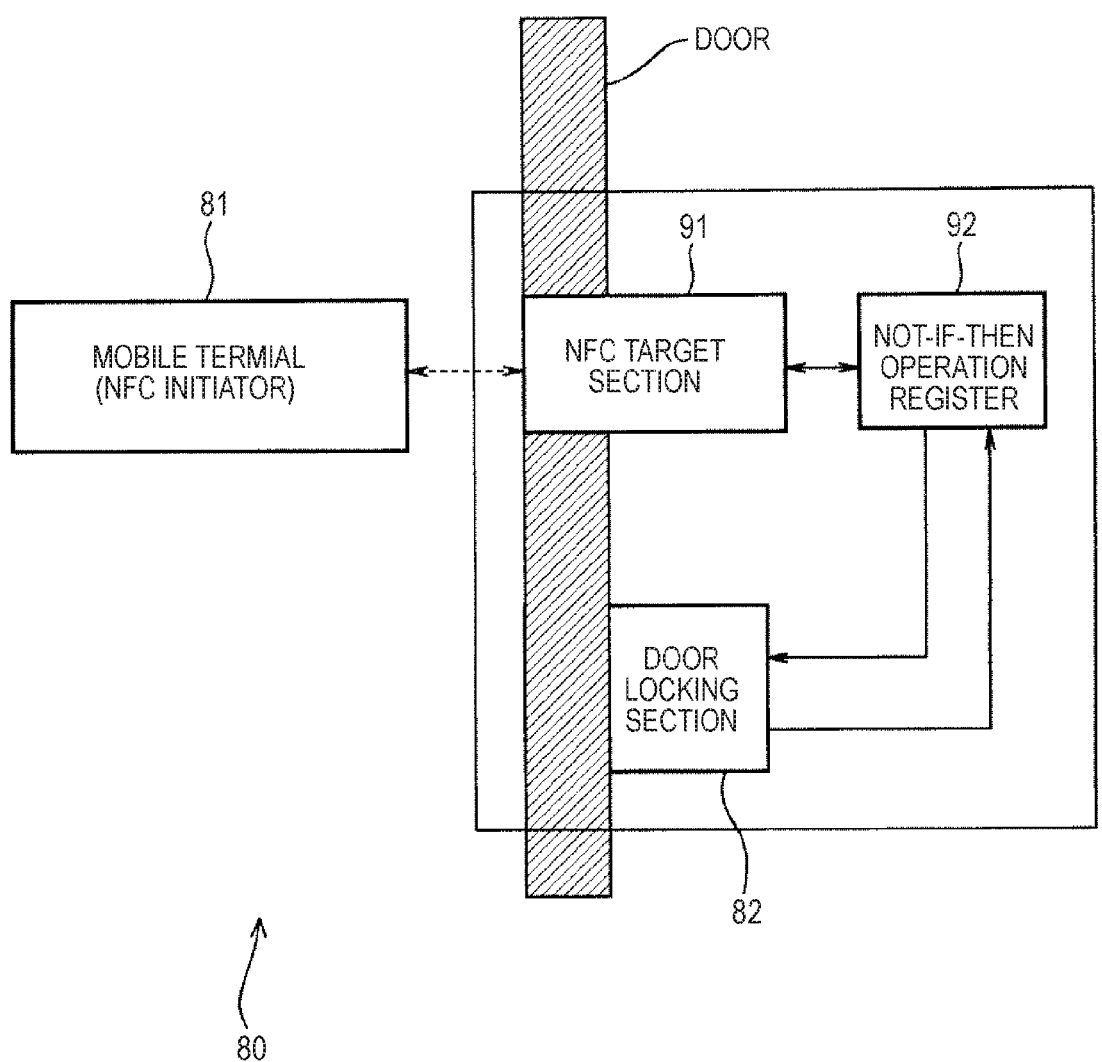
FIG. 8 is a block diagram showing an exemplary configuration of a door locking/unlocking system according to an embodiment.

A door locking/unlocking system according to a second embodiment will now be described with reference to FIG. 8. FIG. 8 shows an exemplary configuration of the door locking/unlocking system. For example, the door locking/unlocking system 80 is used for a door having an auto-lock function provided at an entrance of a condominium, i.e., a door which is automatically locked when closed.

The door locking/unlocking system 80 includes a mobile terminal 81 for unlocking a door and a door locking device 82 provided on the door.

The mobile terminal 81 is basically the same as the mobile terminal 31 of the electronic money system 30 shown in FIG. 2. The mobile terminal 81 is different from the mobile terminal 31 in that it has a secret key which is common to the door locking device 82.

The door locking device 82 includes an NFC target section 91, a NOT-IF-THEN operation register 92, and a locking section 93.

The NFC target section 91 has the functions of an NFC target and carries out near field radio communication with the mobile terminal 81 which has the functions of an NFC initiator.

The NOT-IF-THEN operation register 92 has a configuration similar to that of the NOT-IF-THEN operation register 42 shown in FIG. 3. A DIO 51A of the NOT-IF-THEN operation register 92 is connected to the locking section 93, and a DIO 51B of the register is connected to the NFC target section 91.

The NOT-IF-THEN operation register 92 alternately performs a process of adding a value input from the DIO 51A to a register value and a process of subtracting a value input from the DIO 51B from the register value. That is, the register performs the process of adding a value to the register value and the process of subtracting a value from the register value on an exclusive basis.

The locking section 93 has an auto-lock function and outputs a reset signal and a command for adding a predetermined value (positive value) to the NOT-IF-THEN operation register when the door is locked as it is closed. The locking section 93 unlocks the door when a zero detection signal output from the NOT-IF-THEN operation register 92 is high.

[Description of Operations]

A description will now be made on operations performed by the door locking/unlocking system 80 when the user of the mobile terminal 81 unlocks the door. FIG. 9 is a timing chart for explaining operations of the mobile terminal 81 and the door locking device 82 forming the door locking/unlocking system 80.

The description will be made on operations that follow the automatic locking performed by the door locking device 82 when the door is closed.

At step S401, the locking section 93 generates a reset signal and outputs it to the NOT-IF-THEN operation register 92 after locking the door as it is closed. Upon input of the reset signal, the NOT-IF-THEN operation register 92 changes to an indefinite state in which the register value is initialized to 0 and in which an addition/subtraction control signal is high.

At step S402, the locking section 93 generates a command for adding a predetermined value and outputs it to the NOT-IF-THEN operation register 92. The NOT-IF-THEN operation register 92 to which the command for adding a predetermined value B has been input stays in a standby state at step S403 until it is confirmed that an addition/subtraction control signal is high. When it is confirmed that the addition/subtraction control signal is high, the process proceeds to step S404.

At step S404, a command analyzing portion 55 of the NOT-IF-THEN operation register 92 controls an adder 56 to cause it to add the predetermined value B to the register value. Since the register value changes from 0 to the positive value B as a result of the addition, a transition to a non-zero state takes place, and the addition/subtraction control signal is asserted low by the register 59.

At step S405, the NFC target section 91 stays in a standby state until it is polled by the mobile terminal 81. The above-described steps S401 to S405 are processes performed to lock the door.

Operations performed at the mobile terminal 81 to unlock the door will now be described.

The mobile terminal 81 starts operating as an NFC initiator according to a predetermined application program activated in response to a predetermined operation of the user. Specifically, the mobile terminal 81 starts polling to detect the door locking device 82 at step S501. At step S502, the mobile terminal 81 determines whether the door locking device 82 (specifically, the NFC target section 91 of the same) has been detected or not. The processes at steps S501 and S502 are repeated until it is determined that the door locking device 82 has been detected.

When the user puts the mobile terminal 81 in close proximity to the door locking device 82, the NFC target section 91 of the door locking device 82 detects the polling at step S405 and responds to the polling carried out by the mobile terminal 81 at step S406.

When it is determined at step S502 that the mobile terminal 81 has detected the door locking device 82 from the response of the NFC target section 91, the process proceeds to step S503.

A mutual authentication process is carried out between the mobile terminal 81 and the door locking device 82, the process being performed by the mobile terminal 81 and the door locking device 82 as steps S503 and S407, respectively. The mutual authentication process is carried out using a common secret key provided in each of the mobile terminal 81 and the door locking device 82 in advance and a random number. When the mutual authentication process is successful, the process at the mobile terminal 81 proceeds to step S505. When the mutual authentication process is unsuccessful, the process at the mobile terminal 81 returns to step S501, and the process at the door locking device 82 returns to step S405.

At step S505, the mobile terminal 81 transmits a predetermined value subtraction command to the NOT-IF-THEN operation register 92 for subtracting the predetermined value B from the register value B. Thereafter, the process proceeds to step S506 at which the terminal stays in a standby state until a subtraction process completion notice is received from the door locking device 82.

At step S409, the command analyzing portion 57 of the NOT-IF-THEN operation register 92 receives the predetermined value subtraction command transmitted from the mobile terminal 81 through the DIO 51B.

At step S410, the command analyzing portion 57 of the NOT-IF-THEN operation register 92 checks whether the addition/subtraction control signal is low. When it is confirmed that the addition/subtraction control signal is low, the process proceeds to step S411. At step S411, the command analyzing portion 57 controls a subtractor 58 to cause it to subtract the predetermined value B from the register value B according to the predetermined value subtraction command received at step S409. Since the register value returns to 0 from the positive value B as a result of the subtraction, a transition to a zero state takes place. Thus, a zero detection signal is asserted high by a zero detection portion 60, and the addition/subtraction control signal is asserted high by the register 59.

At step S412, the command analyzing portion 57 confirms that the subtraction process has been completed from the fact that the addition/subtraction control signal has become high and outputs a subtraction process completion notice to the DIO 51B. The subtraction process completion notice is supplied to the mobile terminal 81 by the NFC target section 91.

At step S413, the locking section 93 unlocks the door according to the zero detection signal which has become high. The unlocking operation allows the user of the mobile terminal 81 to open the door. Thereafter, the user of the mobile terminal 81 may move the mobile terminal 81 away from the door locking device 82.

At step S506, the mobile terminal 81 receives the subtraction process completion notice, determines that the subtraction process has been completed, and terminates the series of operations.

As described above, the door locking/unlocking system 80 of the present embodiment allows a door locked by the door locking device 82 to be unlocked using the mobile terminal 81.

In the present specification, the term "system" means a complex unity formed by a plurality of apparatus.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An information processing apparatus comprising:
a register holding a value input thereto;
a first communication path through which an addition command is input;
a second communication path through which a subtraction command is input;
addition means adding a predetermined value to a register value held in the register according to the addition command input through the first communication path and causing the register to hold a value resulting from the addition; and
subtraction means subtracting a predetermined value from a register value held in the register according to the subtraction command input through the second communication path and causing the register to hold a value resulting from the subtraction, wherein
the addition means and the subtraction means operate exclusively of each other, and the addition means operates only when the register value is 0.

2. An information processing apparatus according to claim 1, wherein:
the subtraction means operates only when the register value is not 0.

3. An information processing apparatus according to claim 2, wherein:
a register value acquisition command is also input through the second communication path; and
the subtraction means acquires the register value according to the register value acquisition command input through the second communication path and outputs the register value through the second communication path.

4. An information processing apparatus according to claim 2, further comprising zero detection means generating a zero detection signal indicating that the register value has changed from a non-zero value to zero.

5. An information processing apparatus according to claim 2, further comprising authentication means for performing a mutual authentication process with an electronic apparatus from which the subtraction command is transmitted.

6. An information processing apparatus according to claim 2, further comprising communication means for performing contactless radio communication with a communication apparatus from which the subtraction command is transmitted.

7. An information processing apparatus according to claim 6, wherein the communication means has an NFC (near field communication) target function.

8. An information processing method of an information processing apparatus including a register holding a value input thereto, a first communication path through which an addition command is input, and a second communication path through which a subtraction command is input, the method comprising the steps of:
adding a predetermined value to a register value held in the register according to the addition command input through the first communication path and causing the register to hold a value resulting from the addition; and
subtracting a predetermined value from a register value held in the register according to the subtraction command input through the second communication path and causing the register to hold a value resulting from the subtraction, wherein
the process at the addition step and the process at the subtraction step are performed exclusively of each other, and the process at the addition step is performed only when the register value is 0.

9. An information processing apparatus according to claim 1, wherein the register is included in a NOT-IF-THEN operation register.

10. An information processing apparatus according to claim 1,
wherein the addition command is input through the first communication path without performing authentication via the first communication path, and
wherein the subtraction command is input through the second communication path after performing authentication via the second communication path.

11. An information processing system comprising an information processing apparatus and a communication apparatus, the information processing apparatus including:
a register holding a value input thereto;
a first communication path through which an addition command is input;
a second communication path through which a subtraction command is input;
addition means adding a predetermined value to a register value held in the register according to the addition command input through the first communication path and causing the register to hold a value resulting from the addition; and
subtraction means subtracting a predetermined value from a register value held in the register according to the subtraction command input through the second communication path and causing the register to hold a value resulting from the subtraction,
the addition means and the subtraction means operating exclusively of each other, and the addition means operates only when the register value is 0,
the communication apparatus including:
first connection means connecting to a server through a predetermined communication line;
second connecting means connecting to the information processing apparatus through contactless radio communication; and
relaying means relaying information between the server and the information processing apparatus.

* * * * *